D. B. AYERST.
ELECTROLYTIC CELL.
APPLICATION FILED FEB. 24, 1913.
1,105,015.
Patented July 28, 1914.
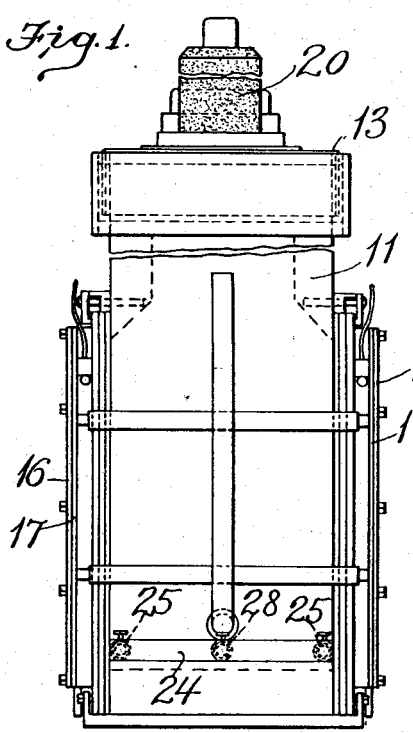
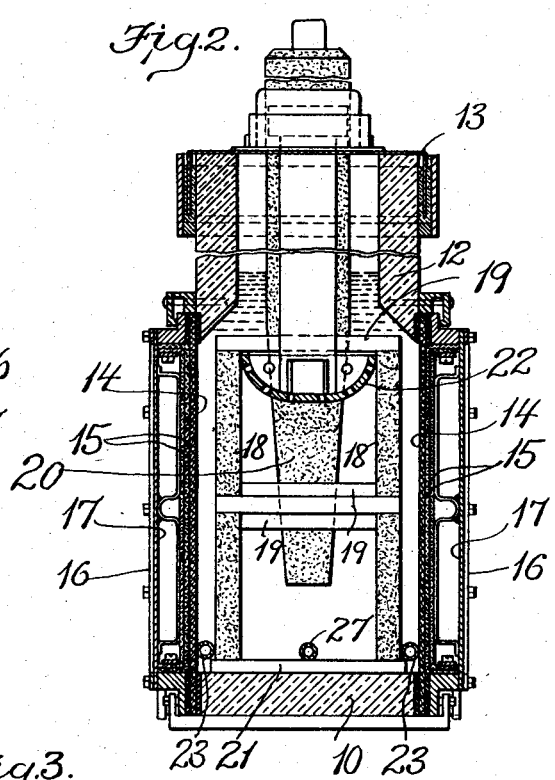
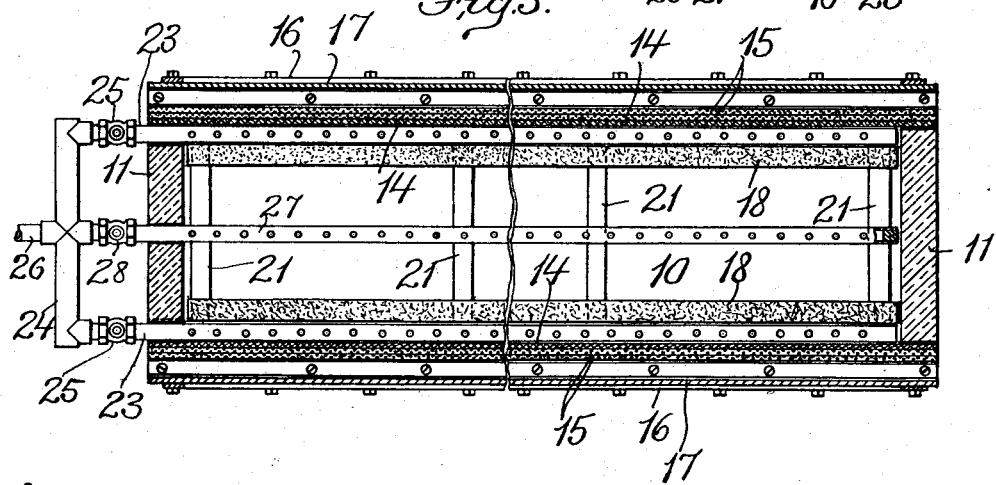
Witnesses:
Inventor:
D. B. Ayerst
Atty's.

UNITED STATES PATENT OFFICE.

DOUGLAS BAYNE AYERST, OF WILMINGTON, DELAWARE.

ELECTROLYTIC CELL.

1,105,015.     Specification of Letters Patent.     Patented July 28, 1914.

Application filed February 24, 1913. Serial No. 750,175.

*To all whom it may concern:*

Be it known that I, DOUGLAS BAYNE AYERST, a citizen of the United States, and a resident of Wilmington, in the county of Newcastle and State of Delaware, have invented certain new and useful Improvements in Electrolytic Cells, of which the following is a specification.

This invention has relation to electrolytic cells of the general character of that illustrated in the co-pending application of Edward A. Allen and Herbert I. Allen, Serial No. 389,824, filed August 23, 1907.

In cells of this general character, which are employed for the electrolysis of saline solutions, the electrolyte is confined in an anode chamber the sides of which are closed by a diaphragm which permits a slow filtration or percolation of the electrolyte through them in contact with cathodes arranged outside of the diaphragm within the cathode chamber, the cathodes being unimmersed. In cells of this general type, it frequently occurs that the diaphragms, which are made of asbestos cloth or asbestos paper, become more or less matted and clogged with impurities which are in suspension in the electrolyte. Experience has shown that the electrolyte should be kept as near saturation as possible. This is accomplished in the cell disclosed in the said application hereinbefore referred to by the employment of a salt receptacle placed in the anode chamber so that the electrolyte will circulate through and around it, but I have found that the saturation of the electrolyte is retarded by the absorption of the chlorin which is given off at the anode.

According to the present invention, I propose to increase the efficiency of the cell by providing means, first, for keeping the diaphragms clean and freeing them so as to prevent the clogging by the settlement of impurities thereon; second, to keep the electrolyte practically in saturation, thereby lowering the voltage; third, regulating the temperature of the electrolyte; and, fourth, freeing the electrolyte of the chlorin as it is given off and preventing the polarization of the anode. I accomplish these objects by discharging air into the chlorin chamber through pipes introduced thereinto for the purpose.

On the accompanying drawings,—Figure 1 represents an end elevation of a cell embodying the invention. Fig. 2 represents a section therethrough. Fig. 3 represents a horizontal section through the cell to show the air-distributing pipes.

The cell body may be formed in any suitable or convenient manner. As shown, it is provided with a bottom wall 10, end walls 11, and upper side walls 12. A cover 13 is luted on the top. The open sides of the cell are closed by one or more layers 14 of asbestos paper or asbestos cloth which will permit a slow filtration or percolation therethrough of the electrolyte which is contained in the anode chamber formed by the cell body of the diaphragm. Outside of the diaphragms there are cathodes 15 consisting of one or more layers of wire gauze, perforated plates, or the like. The diaphragm is held in place by a metallic frame 16 secured to the side, bottom and end walls, and to this frame the margins of the cathode are secured. A plate 17 is secured to the frame so as to form within it the cathode chamber. The anode comprises bars or plates 18 of graphite which are arranged in parallelism with the diaphragm and are separated by a small space therefrom. The plates 18 are connected by cross-bars 19 19 of graphite with which are connected one or more stems 20 of graphite extending upwardly through the cover and to which electrical connections are made. The plates 18 are elevated somewhat above the bottom of the cell and rest upon cross-pieces 21 of glass, hard rubber or the like, so that the electrolyte may circulate around the anode plates. Arranged within the cell between the plates, there is a basket or receptacle 22 into which salt is placed. This basket is below the level of the electrolyte. As thus far described, the cell differs in no respect from that shown in the application of Allen and Allen hereinbefore referred to, and constitutes no portion of my invention.

Extending lengthwise of the cell at the bottom of the anode chamber, there are two pipes 23, 23 which project through one of the end walls 11 and are connected with a manifold 24. These two pipes are made of hard rubber or any other suitable material which will not be affected by chlorin and they are located in the space between the anodes 18, 18 and the diaphragms 14, 14 respectively. Each pipe is provided with a valve 25 by which the flow of air therethrough may be regulated. A supply pipe 26 is connected with the manifold and air may be forced therethrough by a compressor of any suitable type. 27 represents a third pipe substantially like those at 23 except that it is located midway between the anodes. It too is connected with the manifold 24 and is provided with a valve 28. The valves, of course, are located outside of the anode chamber where they are convenient of access. Each of the pipes is provided with a plurality of small apertures, as clearly shown in Fig. 3, so that, when air is forced into the pipe, it will emerge in small jets.

When air is forced through the pipes 23, it has the effect of greatly increasing the rate of circulation of the electrolyte upwardly between the diaphragms and their adjacent anodes, and prevents the settlement of impurities upon the inner faces of the diaphragms. The jets of air keep the diaphragms free from impurities and also have the effect of removing any impurities that may have settled thereon. The upward flow of the air through the body of the electrolyte also has the effect of freeing the chlorin from the anodes and prevents the polarization of the anode with a consequent rise in the voltage of the current. A further effect of the discharge of air into the electrolyte is that it assists greatly in freeing the electrolyte from chlorin, particularly when the cell is shut down for any purpose, and at all times it assists in keeping the electrolyte at saturation by forcing it by rapid circulation through the baskets containing salt. The air may be emitted from all three pipes at the same time or it may be emitted only through the two outer pipes. When the cell is shut down and the current is cut off, the air may be passed through the individual pipe 27 only for the purpose of freeing the electrolyte of the chlorin.

It is quite apparent that, by regulating the temperature of the air delivered to the pipes, it is possible to regulate the temperature of the electrolyte and the chlorin. Cold air may be admitted in the summer time and heated air in the winter.

Having thus explained the nature of my said invention and described a way of making and using the same, although without attempting to set forth all of the forms in which it may be made or all of the modes of its use, what I claim is:

1. A cell for electrolyzing saline solutions, comprising a body constituting an anode chamber, diaphragms closing the sides of said chamber, cathodes outside said diaphragms, anodes within said body and confronting said diaphragms, and perforated pipes within said chamber and located between the anodes and the diaphragms for delivering air into the body of electrolyte, substantially as and for the purposes herein described.

2. A cell for electrolyzing saline solutions, comprising a body constituting an anode chamber, diaphragms closing the sides of the chamber, cathodes outside the diaphragms, anodes within said body and confronting the diaphragms, a salt receptacle within the said body and immersed in the electrolyte, and valved pipes within the chamber and located respectively between the anodes and between each anode and its confronting diaphragm for delivering air into the body of the electrolyte, substantially for the purposes set forth.

In testimony whereof I have affixed my signature, in presence of two witnesses.

DOUGLAS BAYNE AYERST.

Witnesses:
JOSEF E. HEDIN,
HERBERT I. ALLEN.